United States Patent
Sumioka (10) Patent No.: US 8,154,645 B2
(45) Date of Patent: Apr. 10, 2012

(54) IMAGE PICKUP SYSTEM INCLUDING IMAGE PICKUP DEVICE AND CONNECTION DEVICE FOR CONNECTING TO EXTERNAL DISPLAY DEVICE

(75) Inventor: Daisuke Sumioka, Amagasaki (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 236 days.

(21) Appl. No.: 12/710,803

(22) Filed: Feb. 23, 2010

(65) Prior Publication Data
US 2010/0220196 A1    Sep. 2, 2010

(30) Foreign Application Priority Data

Feb. 27, 2009    (JP) .................................. 2009-046290
Jan. 27, 2010    (JP) .................................. 2010-015331

(51) Int. Cl.
*H04N 5/262* (2006.01)
*H04N 5/222* (2006.01)
*H04N 5/225* (2006.01)
(52) U.S. Cl. .............. 348/333.02; 348/239; 348/373
(58) Field of Classification Search .............. 348/207.1, 348/207.2, 239, 333.02, 373, 375, 376, 231.5; 345/636, 467
See application file for complete search history.

(56) References Cited

U.S. PATENT DOCUMENTS

| | | | | |
|---|---|---|---|---|
| 6,492,994 B2 * | 12/2002 | Yokouchi | ...................... | 345/619 |
| 7,167,206 B2 * | 1/2007 | Kayanuma | ...................... | 348/375 |
| 2002/0149695 A1 * | 10/2002 | Kayanuma | ...................... | 348/375 |
| 2004/0213542 A1 * | 10/2004 | Hamasaka et al. | .............. | 386/46 |
| 2006/0023069 A1 * | 2/2006 | Saito | ........................ | 348/207.99 |
| 2006/0244833 A1 * | 11/2006 | Abe et al. | ..................... | 348/207.1 |
| 2007/0015550 A1 * | 1/2007 | Kayanuma | ................. | 455/575.1 |

FOREIGN PATENT DOCUMENTS

| | | | |
|---|---|---|---|
| JP | 2003-169243 A | | 6/2003 |
| JP | 2004201227 A | * | 7/2004 |
| JP | 2006295652 A | * | 10/2006 |
| JP | 2007-28537 A | | 2/2007 |
| JP | 2007-274270 A | | 10/2007 |
| JP | 2008-141537 A | | 6/2008 |

* cited by examiner

*Primary Examiner* — John Villecco
(74) *Attorney, Agent, or Firm* — Westerman, Hattori, Daniels & Adrain, LLP (57) ABSTRACT

An image pickup system including an image pickup device and a connection device is provided. The image pickup device includes an image pickup unit which picks up a subject image, a display unit, a first character image generation unit, and a first control unit. The first character image generation unit generates a first character image representing one or more characters to be displayed on the display unit. The first control unit outputs the subject image and information representing the above-noted one or more characters to the connection device when the image pick-up device and the connection device are connected with each other. The connection device includes a second character image generation unit. The second character image generation unit generates a second character image representing one or more characters to be displayed on an external display device, based on the information representing the above-noted one or more characters.

9 Claims, 8 Drawing Sheets

IMAGE PICKUP SYSTEM INCLUDING IMAGE PICKUP DEVICE AND CONNECTION DEVICE FOR CONNECTING TO EXTERNAL DISPLAY DEVICE

BACKGROUND OF THE INVENTION

1. Field of the Invention

The present invention relates to an image pickup system including an image pickup device such as a digital camera (electronic camera) and a connection device connectable thereto, and more particularly to an image pickup system for connecting an image pickup device to an external display device through a connection device.

2. Description of the Related Art

A connection device is conventionally used which is called a cradle for charging a battery contained in an electronic camera and for connecting the electronic camera to an external device or a network. For example, a cradle is used to allow external display equipment to display an image of a subject that is generated by an electronic camera.

Usually, a date and a menu screen in addition to a subject image can be displayed on a monitor of an electronic camera. When an electronic camera is connected to external display equipment through a cradle, such information is also displayed on the external display equipment. In the conventional electronic camera, however, the characters displayed on the monitor unit of the electronic camera are enlarged and displayed as they are on the external display equipment. Therefore, illegible, low-resolution characters are displayed on the external display equipment.

SUMMARY OF THE INVENTION

In an aspect, the present invention provides an image pickup system including an image pickup device and a connection device connectable to the image pickup device. The image pickup device includes an image pickup unit which picks up a subject image, a display unit, a first character image generation unit, and a first control unit. The first character image generation unit generates a first character image representing one or more characters. The first control unit allows the display unit to display the subject image, the first character image, or a combined image of the subject image with the first character image, when a connected state in which the image pickup device and the connection device are connected with each other is not established. The first control unit outputs the subject image and information representing the above-noted one or more characters to the connection device when the connected state is established. The connection device includes a second character image generation unit and a second control unit. The second character image generation unit generates a second character image representing one or more characters based on the information representing one or more characters received from the image pickup device when the connected state is established. The second control unit allows an external display device to display the subject image received from the image pickup device when the connected state is established, the second character image, or a combined image of the subject image with the second character image.

Preferably, a total number of pixels of the external display device is greater than a total number of pixels of the display unit, and a resolution of the second character image is higher than a resolution of the first character image.

Preferably, the image pickup device further includes an operation unit which accepts selection of one of first and second display modes from a user. In this case, the first control unit allows the display unit to display the subject image when the first display mode is selected and the connected state is not established. The first control unit outputs the subject image to the connection device when the first display mode is selected and the connected state is established. The first control unit allows the display unit to display a combined image of the subject image with the first character image when the second display mode is selected and the connected state is not established. The first control unit outputs the subject image and information representing the above-noted one or more characters to the connection device when the second display mode is selected and the connected state is established. The second control unit outputs the subject image to the external display device when the first display mode is selected and the connected state is established. The second control unit outputs a combined image of the subject image with the second character image to the external display device when the second display mode is selected and the connected state is established.

Preferably, the information representing one or more characters is one or more character codes respectively corresponding to one or more characters.

Preferably, the connection device is connected to an external power supply. The image pickup device further includes a power supply node receiving electric power supplied from the external power supply through the connection device when the connected state is established, and a voltage detection unit which detects a value of voltage applied to the power supply node. In this case, the first control unit senses that the connected state is established, based on that the value of voltage detected by the voltage detection unit reaches a prescribed reference value.

Preferably, the image pickup device further includes a storage unit which stores a subject image when the image pickup unit picks up an image of the subject. In this case, the above-noted one or more characters are information related to the subject image. The storage unit stores the information representing one or more characters together with the subject image related thereto when the image pickup unit picks up an image of the subject. The first control unit reads the related information representing one or more characters together with the subject image from the storage unit. The first control unit allows the first character image generation unit to generate the first character image corresponding to the information representing one or more characters read from the storage unit when the connected state is not established, and outputs the information representing one or more characters read from the storage unit to the connection device when the connected state is established.

In another aspect of the present invention, the image pickup device includes an image pickup unit which picks up a subject image, a display unit, an operation unit, a first storage unit, and a first control unit. The operation unit accepts selection of one menu from a plurality of preset menus, from a user. The first storage unit stores a plurality of first display images preset respectively corresponding to the plurality of menus. The first control unit allows the display unit to display the subject image when a connected state in which the image pickup device and the connection device are connected with each other is not established and when a selected state in which a menu is selected by the user is not established. The first control unit allows the display unit to display a first display image corresponding to a menu selected by the user or a combined image of the subject image with a first display image corresponding to a menu selected by the user when the connected state is not established and the selected state is established. The first control unit outputs the subject image to the connection device when the connected state is established. The first control unit outputs information of a menu selected by the user to the connection device when the connected state is established and the selected state is established. The connection device includes a second storage unit and a second control unit. The second storage unit stores a plurality of second display images preset respectively corresponding to the plurality of menus. The second control unit allows an external display device to display the subject image received from the image pickup device when the connected state is established and the selected state is not established. The second control unit allows the external display device to display a second display image corresponding to information of a menu selected by the user that is received from the image pickup device or a combined image of the subject image with a second display image corresponding to information of a menu selected by the user when the connected state is established and the selected state is established.

Preferably, a total number of pixels of the external display device is greater than a total number of pixels of the display unit, and a resolution of each of the plurality of second display images is higher than a resolution of each of the plurality of first display images.

In a further aspect of the present invention, the image pickup device includes an image pickup unit which picks up a subject image, a display unit, a first character image generation unit, and a first control unit. The first character image generation unit generates a first character image representing one or more characters based on related information related to the subject image. The first control unit allows the display unit to display the subject image, the first character image, or a combined image of the subject image with the first character image when a connected state in which the image pickup device and the connection device are connected with each other is not established. The first control unit outputs the subject image and the related information to the connection device when the connected state is established. The connection device includes a second character image generation unit and a second control unit. The second character image generation unit generates a second character image representing one or more characters based on the related information received from the image pickup device when the connected state is established. The second control unit allows an external display device to display the subject image received from the image pickup device when the connected state is established, the second character image, or a combined image of the subject image with the second character image. Here, a total number of pixels of the external display device is greater than a total number of pixels of the display unit. A resolution of the second character image is higher than a resolution of the first character image.

In accordance with the present invention as described above, when an electronic camera (image pickup device) is connected to a cradle (connection device), information related to a subject image, such as date and time, or a menu screen is not added to the subject image in the electronic camera, while a high-resolution image representing the same contents is generated in the cradle and then output to external display equipment. Therefore, the main advantage of the present invention is in that a character or a character string displayed on a display unit of an electronic camera can also be displayed at high resolution on an external display device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following embodiment, an image pickup system formed of an electronic camera and a cradle will be described as an example of image pickup system.

Figure 1:
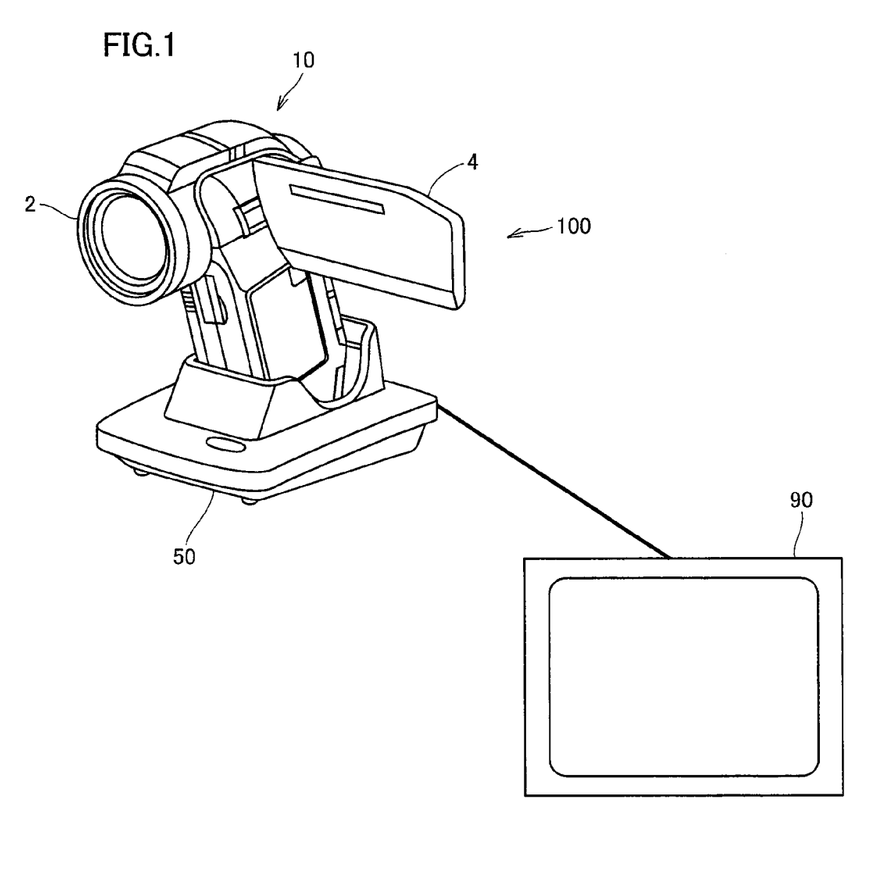
FIG. 1 is an external view showing that an image pickup system in accordance with an embodiment of the present invention is connected to external display equipment.

Referring to FIG. 1, an image pickup system 100 in accordance with an embodiment of the present invention is configured with an electronic camera 10 and a cradle 50 on which electronic camera 10 is placed. Electronic camera 10 outputs image data to external display equipment 90 through cradle 50.

Figure 2:
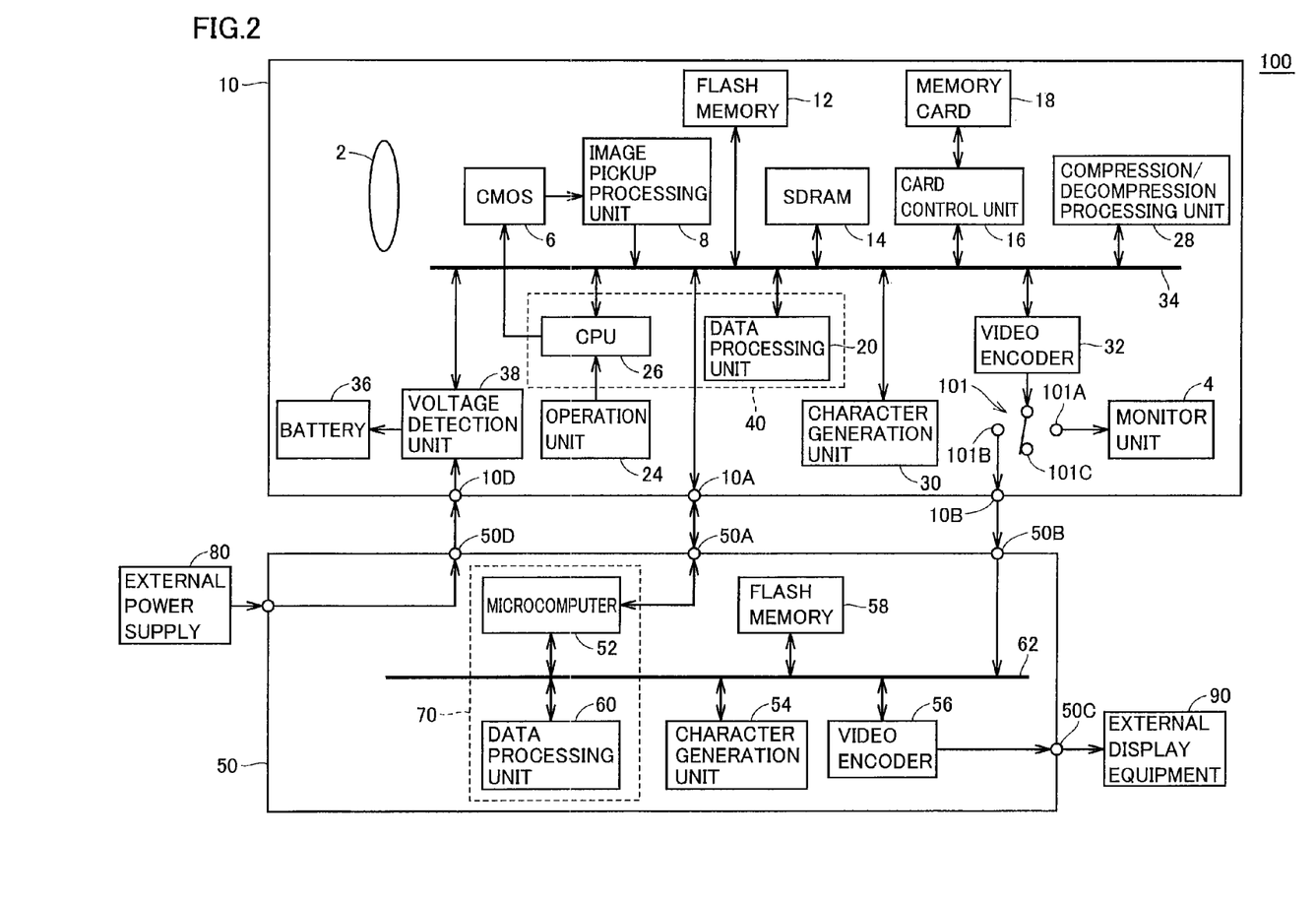
FIG. 2 is a block diagram showing a configuration of an electronic camera and a cradle that form the image pickup system in FIG. 1.

FIG. 2 is a block diagram showing a configuration of electronic camera 10 and cradle 50. Referring to FIG. 2, electronic camera 10 includes an image pickup lens 2, a CMOS (Complementary Metal-Oxide Semiconductor) image sensor 6, an image pickup processing unit 8, a CPU (Central Processing Unit) 26, a communication input/output terminal 10A, a video output terminal 10B, an operation unit 24, an SDRAM (Synchronous Dynamic Random Access Memory) 14, a compression/decompression processing unit 28, a data processing unit 20, a character generation unit 30, a flash memory 12, a card control unit 16, a memory card 18, a video encoder 32, a switch 101, and a monitor unit 4. CPU 26 and data processing unit 20 form a first control unit 40.

Image pickup lens 2 forms an optical image of a subject on an image pickup surface of CMOS image sensor 6 serving as an image pickup device. A digital image pickup signal output from CMOS image sensor 6 is processed by image pickup processing unit 8 and converted into a Y signal that is a luminance signal and a U, V signal that is a color difference signal. The position in optical axis direction of image pickup lens 2 is adjusted based on an output signal of CMOS image sensor 6.

CPU 26 is connected with image pickup processing unit 8, communication input/output terminal 10A, SDRAM 14, compression/decompression processing unit 28, data processing unit 20, character generation unit 30, flash memory 12, card control unit 16, and the input node of video encoder 32, through a bus 34. The output node of video encoder 32 is connected to switch 101. Switch 101 has output terminals 101A, 101B, 101C. Output terminal 101B is connected to video output terminal 10B of electronic camera 10, and output terminal 101A is connected to monitor unit 4.

CPU 26 controls image pickup processing unit 8, SDRAM 14, compression/decompression processing unit 28, data processing unit 20, character generation unit 30, flash memory 12, card control unit 16, and video encoder 32, in accordance with a program stored in flash memory 12. Card control unit 16 is connected to memory card 18 to control data write into memory card 18 and data read from memory card 18 in accordance with an instruction from CPU 26.

In response to an operation on operation unit 24 by the user, an image pickup process and a replay process are executed by CPU 26. The user can select one of a plurality of preset operations using operation unit 24.

Specifically speaking of the image pickup process, CPU 26 compresses the picked-up moving images or still image by compression/decompression processing unit 28. CPU 26 thereafter controls card control unit 16 such that the compressed moving image data or still image data is recorded as a moving image file or a still image file in memory card 18. Here, CPU 26 also allows information related to a subject image (hereinafter referred to as "related information"), such as a shooting date, a shooting time, and a file name, to be recorded in memory card 18. For example, when a date as an example of related information is recorded in memory card 18, it may be recorded as a plurality of character codes (ASCII codes, for example) or as a numeric string (binary data) representing year, month and day.

Specifically speaking of the replay process, CPU 26 reads a moving image file or a still image file recorded in memory card 18 and decompresses the read file into original image data by compression/decompression processing unit 28. The related information recoded in memory card 18 is also read from memory card 18 together with the image file. CPU 26 thereafter converts the decompressed image data into an analog video signal by video encoder 32 and outputs the converted analog video signal to monitor unit 4 or video output terminal 10B through switch 101. SDRAM 14 is used to temporarily store data in such image pickup process and replay process.

The related information related to a subject image that is recorded in memory card 18 can also be displayed on monitor unit 4 of electronic camera 10. In this case, at least part of the related information may be converted into an image and combined with the subject image and then displayed on monitor unit 4. Alternatively, only the related information may be displayed apart from the subject image on monitor unit 4, as is the case where, for example, a list of file names recorded in memory card 18 is displayed on monitor unit 4.

In the case where at least part of the related information recorded in memory card 18 is displayed on monitor unit 4, character generation unit 30 generates an image (referred to as "character image") corresponding to a character string representing the related information to be displayed, using font data stored beforehand in flash memory 12. Data of bitmap fonts, outline fonts, and the like may be used as font data. The resolution of the generated character image varies depending on the total number of pixels of monitor unit 4.

CPU 26 thereafter adds the character image generated by character generation unit 30 to the analog video signal converted by video encoder 32, in accordance with a prescribed operation on operation unit 24. In this case, the analog video signal is first stored in data processing unit 20 and the character image is then added to the stored analog video signal. In the case where the related information alone is displayed on monitor unit 4, CPU 26 replaces the analog video signal stored in data processing unit 20 with the character image generated by character generation unit 30.

In order to output data from electronic camera 10 to cradle 50, electronic camera 10 is provided with communication input/output terminal 10A and video output terminal 10B. Communication input/output terminal 10A is connected to CPU 26 of electronic camera 10. Related information related to a subject image, such as a shooting data, as well as a control signal is output from communication input/output terminal 10A to cradle 50. An analog video signal is output from video output terminal 10B to cradle 50.

Cradle 50 includes a microcomputer 52, a character generation unit 54, a flash memory 58, a data processing unit 60, and a video encoder 56. Microcomputer 52 and data processing unit 60 form a second control unit 70. Cradle 50 further includes a communication input/output terminal 50A and a video input terminal 50B for connecting to communication input/output terminal 10A and video output terminal 10B, respectively. Microcomputer 52 is connected to communication input/output terminal 50A.

Cradle 50 further includes a video output terminal 50C. Video output terminal 50C can connect to external display equipment 90. External display equipment 90 has more total pixels than monitor unit 4 of electronic camera 10. Video output terminal 50C is connected to video encoder 56 of cradle 50.

Microcomputer 52 is connected to video input terminal 50B, data processing unit 60, character generation unit 54, flash memory 58, and video encoder 56 through a bus 62.

Microcomputer 52 controls data processing unit 60, character generation unit 54, flash memory 58, and video encoder 56 in accordance with a program stored in flash memory 58.

In the case where at least part of related information such as a shooting date and time is displayed on external display equipment 90, microcomputer 52 allows character generation unit 54 to generate a character image corresponding to a character string representing the related information to be displayed on external display equipment 90, based on the related information received from electronic camera 10. Here, character generation unit 54 generates a character image according to the total number of pixels of external display equipment 90 based on the font data stored beforehand in flash memory 58. Data of bitmap fonts, outline fonts, and the like can be used as font data.

Microcomputer 52 adds the character image generated in character generation unit 54 to the analog video signal input from video input terminal 50B. In this case, the analog video signal is first stored in data processing unit 60 and the character image is then added to the stored analog video signal. In the case where the character image alone is displayed on external display equipment 90, microcomputer 52 replaces the analog video signal stored in data processing unit 60 with the character image generated in character generation unit 54. Video encoder 56 converts the output data of data processing unit 60 into an analog video signal for output to external display equipment 90.

Electronic camera 10 further includes a power supply terminal 10D, a battery 36 for driving electronic camera 10, and a voltage detection unit 38. Cradle 50 further includes a power supply terminal 50D connected to power supply terminal 10D of electronic camera 10. Cradle 50 is connected to an external power supply 80. Electronic camera 10 receives electric power supplied from external power supply 80 through power supply terminals 10D and 50D when it is connected to cradle 50. Accordingly, battery 36 is charged. Voltage detection unit 38 detects voltage of power supply terminal 10D. CPU 26 senses that electronic camera 10 and cradle 50 are in the connected state based on that a prescribed reference voltage is detected by voltage detection unit 38.

Figure 3:
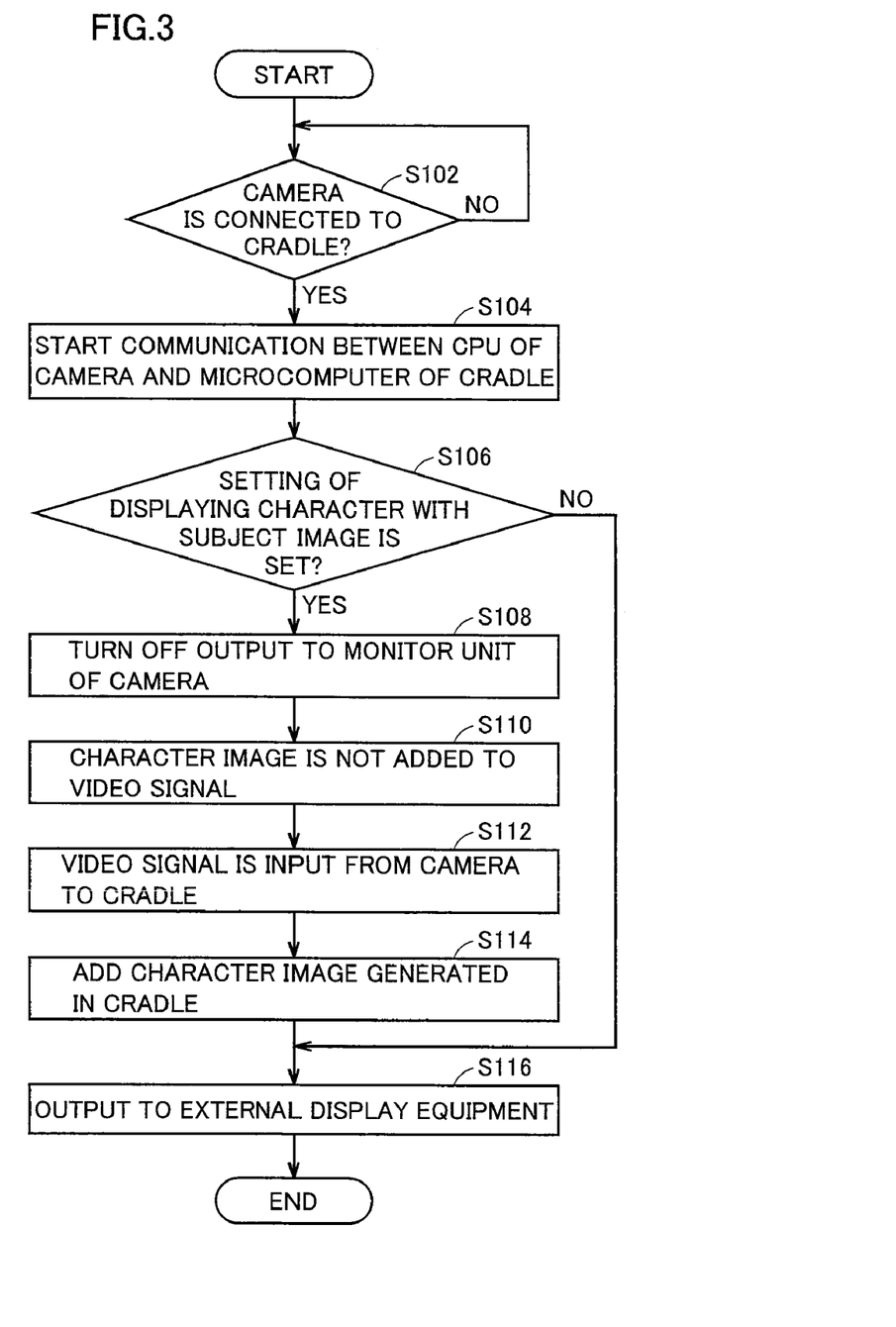
FIG. 3 is a flowchart illustrating an exemplary operation of the image pickup system in FIG. 2.

Referring now to the block diagram in FIG. 2 and the flowchart in FIG. 3, an exemplary operation of image pickup system 100 in FIG. 2 will be described. FIG. 3 shows an operation of image pickup system 100 in the case where only a subject image is displayed on external display equipment 90 and in the case where a subject image is combined with an image representing a shooting date or a shooting time related thereto and then displayed on external display equipment 90.

First, in step S102, CPU 26 contained in electronic camera 10 determines whether or not electronic camera 10 is connected to cradle 50. If CPU 26 determines NO (not-connected state), the process in step S102 is repeated. If CPU 26 determines YES (connected state), the process proceeds to step S104. In step S104, CPU 26 starts communication with microcomputer 52 contained in cradle 50.

Then, in step S106, CPU 26 determines whether or not the display mode is set such that the related shooting date, shooting time, and the like is displayed together with a subject image on monitor unit 4 or external display equipment 90. The settings of display modes are stored in flash memory 12 of electronic camera 10, and the initial setting is set to a mode of displaying only a subject image. The user can select a display mode by operating operation unit 24.

If CPU 26 determines NO in step S106, the process proceeds to step S116. In step S116, CPU 26 switches the output terminal of switch 101 from terminal 101A to terminal 101B. Accordingly, the output destination of the analog video signal to which the image representing a shooting date, a shooting time, and the like is not added is switched from monitor unit 4 to cradle 50. Microcomputer 52 contained in cradle 50 outputs the analog video signal output from video output terminal 10B of electronic camera 10, from video output terminal 50C of cradle 50 to external display equipment 90. The subject image is thereafter displayed on external display equipment 90.

If CPU 26 determines YES in step S106, the process proceeds to step S108. In step S108, CPU 26 switches the output terminal of switch 101 from terminal 101A to terminal 101C located between terminal 101A and terminal 101B and turns off the video output to monitor unit 4 of electronic camera 10.

Then, in step S110, CPU 26 prohibits the character image generated in character generation unit 30 of electronic camera 10 from being added to the analog video signal. CPU 26 outputs information (for example, character codes) representing a character or a character string to be displayed on external display equipment 90, to cradle 50 through communication input/output terminal 10A.

Then, in step S112, CPU 26 switches the output terminal of switch 101 from terminal 101C to terminal 101B. Accordingly, the analog video signal to which information such as a date is not added is input from video output terminal 10B of electronic camera 10 to video input terminal S0B of cradle 50. The input analog video signal is temporarily stored by data processing unit 60 of cradle 50.

In the next step S114, microcomputer 52 contained in cradle 50 allows character generation unit 54 of cradle 50 to generate a character image based on the information (for example, character codes) representing a character or a character string received from electronic camera 10. Data processing unit 60 adds the generated character image to the analog video signal based on control of microcomputer 52.

Then, in step S116, video encoder 56 outputs the video signal to which the character image is attached in data processing unit 60, from video output terminal 50C of cradle 50 to external display equipment 90. The video signal with the character image added thereto is displayed on external display equipment 90.

Figure 4:
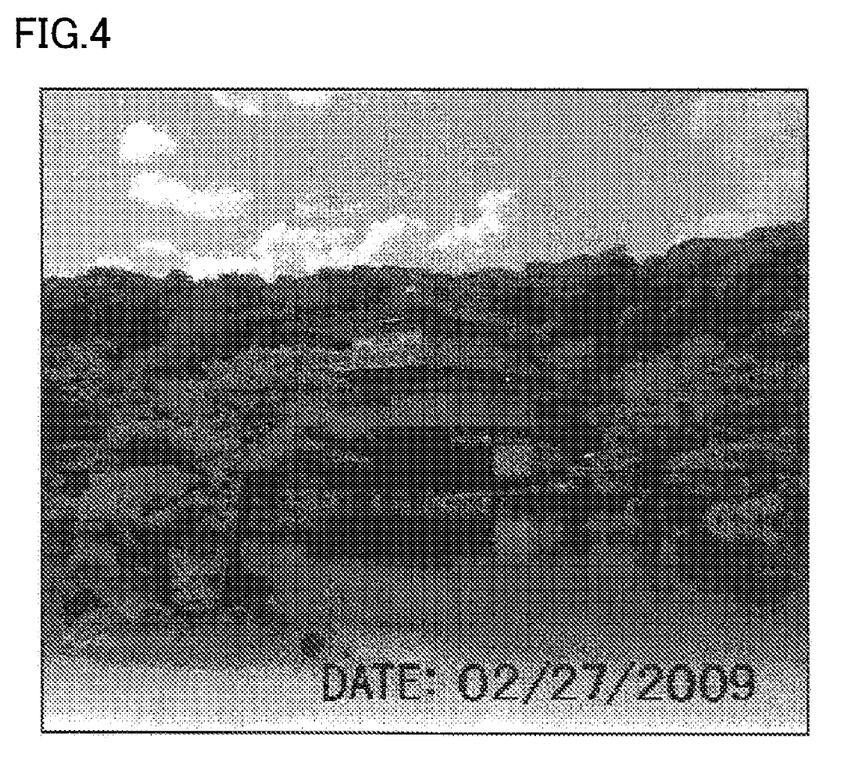
FIG. 4 shows an example of a character string displayed together with a subject image on external display equipment (in the case where an image displayed on a monitor unit of the electronic camera is enlarged and displayed on external display equipment).
Figure 5:
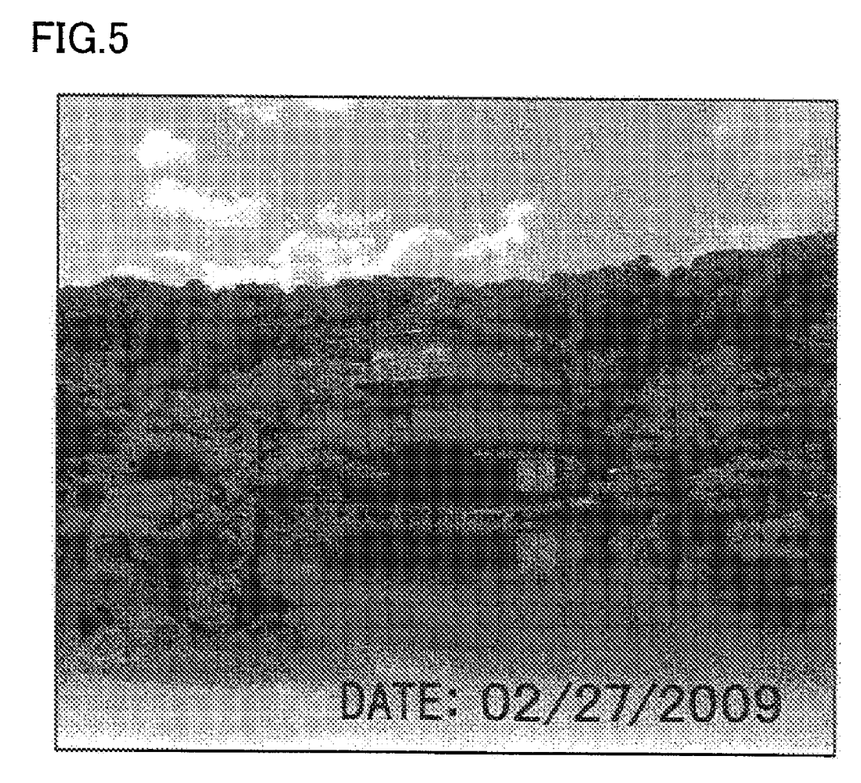
FIG. 5 shows an example of a character string displayed together with a subject image on external display equipment (in the case of the image pickup system in the present embodiment).

FIG. 4 and FIG. 5 show an example of a character string displayed together with a subject image on external display equipment 90. FIG. 4 shows the case where an image displayed on monitor unit 4 of electronic camera 10 is enlarged and displayed as it is, unlike the present embodiment. FIG. 5 shows the case of image pickup system 100 of the present embodiment. According to image pickup system 100 of the present embodiment, as illustrated in FIG. 5, the image of the same date as illustrated in FIG. 4 can be displayed at high resolution and at high definition.

As described above, conventionally, in the case of electronic camera 10, an image displayed on monitor unit 4 is enlarged and displayed as it is on external display equipment 90. Therefore, a low-resolution and low-visibility character or character string is displayed on external display equipment 90. In image pickup system 100 of the present embodiment, when electronic camera 10 is connected to cradle 50, electronic camera 10 does not add information related to a subject image, such as a shooting date and a shooting time, to the subject image, but cradle 50 generates a high-resolution character image representing the same contents and adds the generated character image to the image data received from electronic camera 10 for output to external display equipment 90. Accordingly, the high-resolution, fine image representing a character can be displayed together with the subject image on external display equipment 90.

As described above, although cradle 50 is additionally provided with a function of generating a character image, image data of a subject is received as a video signal from electronic camera 10, as is conventionally done. Therefore, the circuit size of cradle 50 is not significantly increased as compared with the conventional one.

In the case where only a character image is displayed in place of a subject image, data processing unit 60 replaces the stored analog video signal with the character image generated in character generation unit 54, in the above-noted step S114. Then, in the next step S116, video encoder 56 reads the character image stored in data processing unit 60 for output to external display equipment 90. Accordingly, only the character image can be displayed on external display equipment 90.

Figure 6:
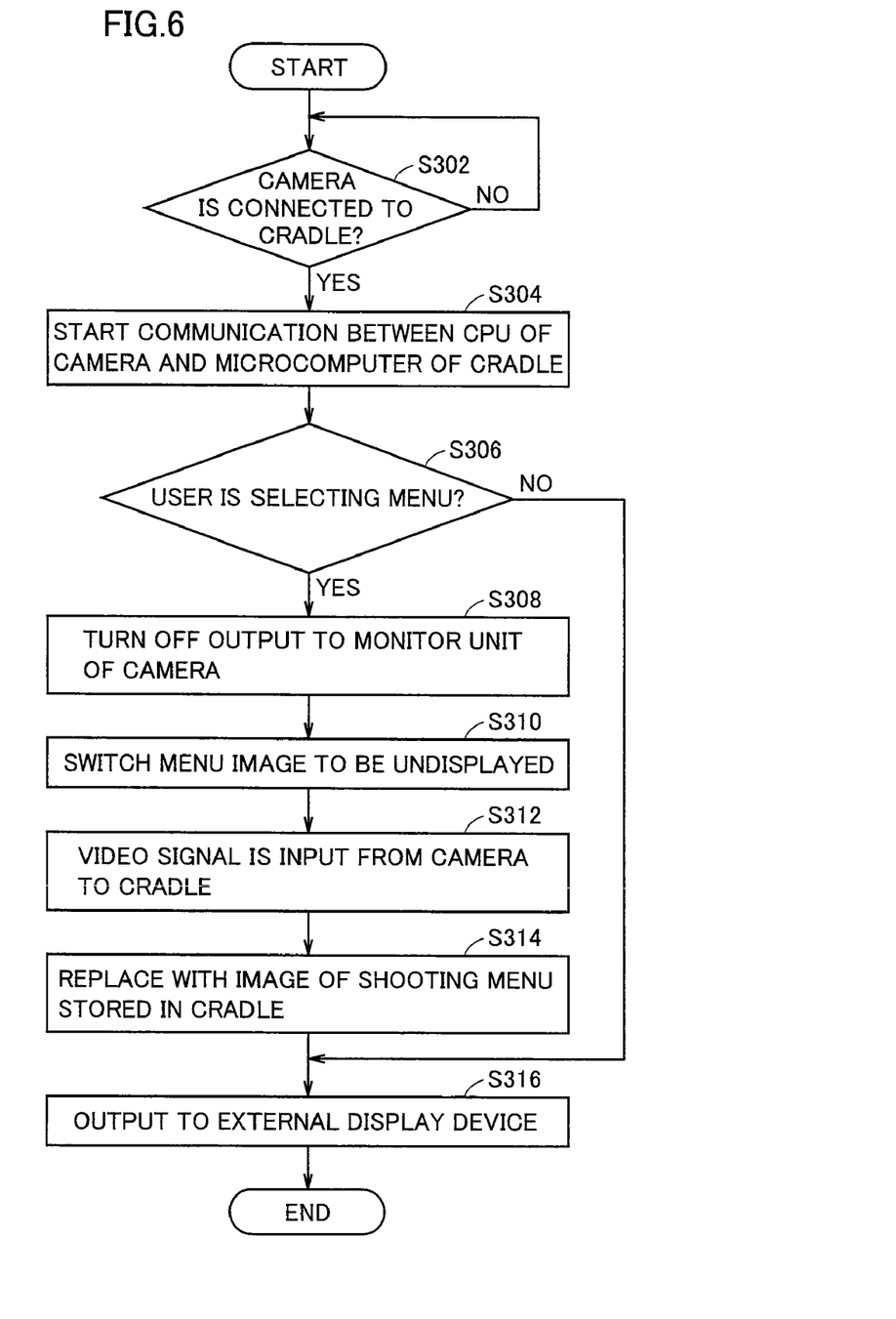
FIG. 6 is a flowchart illustrating another exemplary operation of the image pickup system in FIG. 2.
Figure 7:
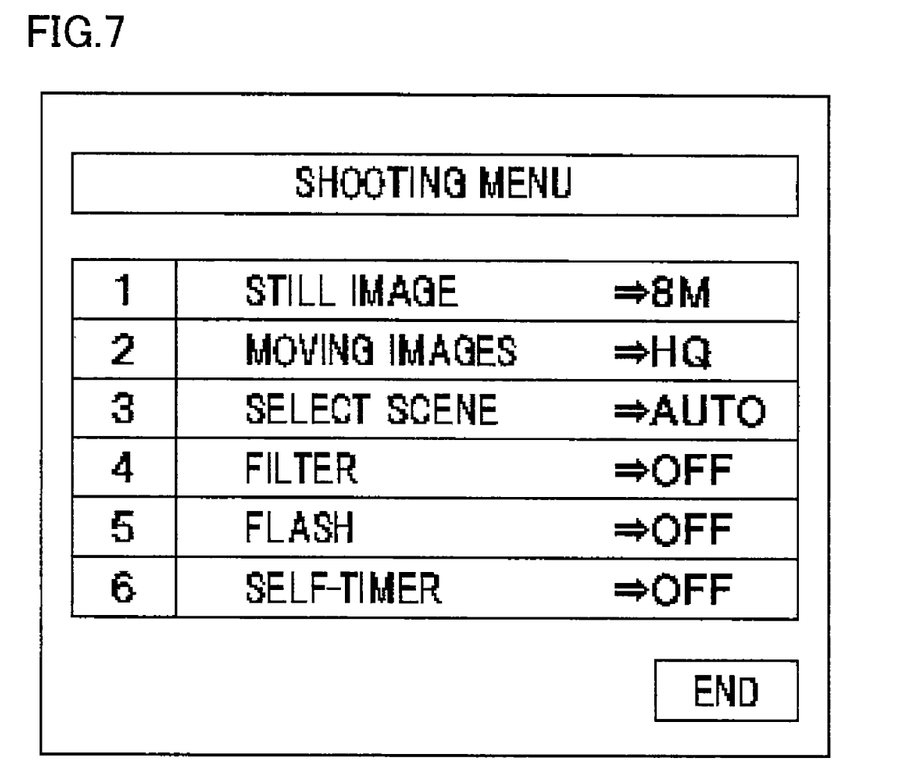
FIG. 7 shows an example of a menu displayed on external display equipment (in the case where an image displayed on the monitor unit of the electronic camera is enlarged and displayed).
Figure 8:
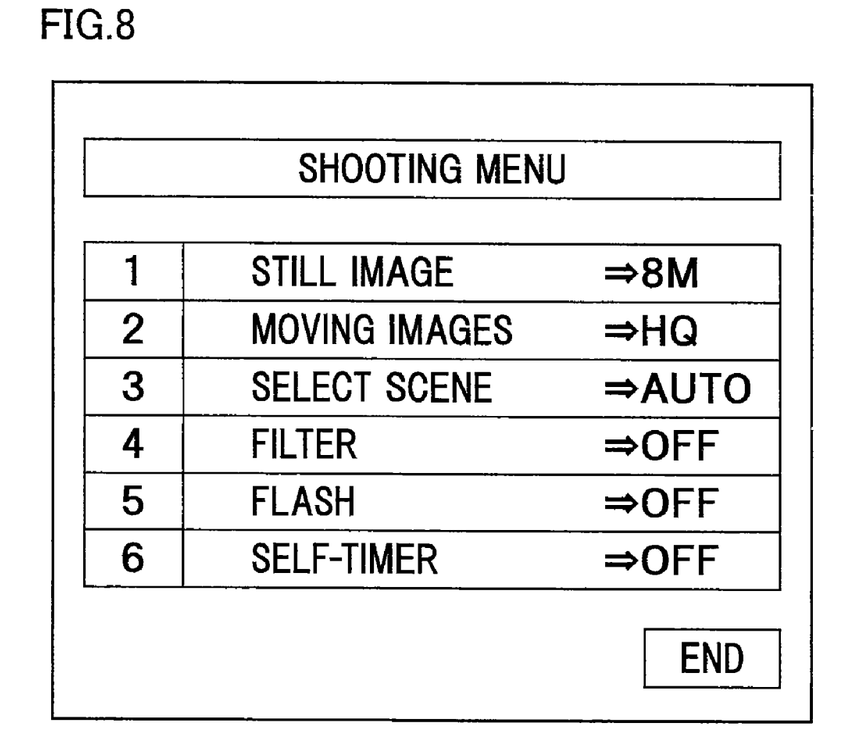
FIG. 8 shows an example of a menu displayed on external display equipment (in the case of the image pickup system in the present embodiment).

Referring now to the block diagram in FIG. 2 and the flowchart in FIG. 6, another exemplary operation of image pickup system 100 in FIG. 2 will be described. FIG. 6 illustrates that an image of a shooting menu as shown in FIG. 7, FIG. 8 is displayed on monitor unit 4 of electronic camera 10 or external display equipment 90.

An image (also referred to as "display image") of a menu selected by the user using operation unit 24 appears on monitor unit 4. The menu is options displayed on the screen. Electronic camera 10 is provided with many menus such as a shooting menu for setting shooting conditions of the electronic camera and an image processing menus for processing the picked-up subject image. The user can select which of a plurality of menus is to be displayed on the screen, using operation unit 24, and in addition, can select an item that he wants to process, among options on the menu displayed on the screen.

Therefore, in order to display menus on monitor unit 4, a plurality of display images respectively corresponding to a plurality of menus selectable by the user are stored beforehand in flash memory 12 of electronic camera 10. When the user selects a menu using operation unit 24, CPU 26 reads the display image corresponding to the selected menu from flash memory 12 and displays that image on monitor unit 4. Here, the display menu representing the menu that appears on monitor unit 4 is not limited to characters. For example, in order to select people or a scene as the subject, an icon representing people and an icon representing a scene may be displayed on the screen. The resolution of the image such as a shooting menu to be displayed on monitor unit 4 is determined according to the total number of pixels of monitor unit 4.

On the other hand, the display image such as a shooting menu to be displayed on external display equipment 90 is stored beforehand in flash memory 58 of cradle 50, corresponding to each of a plurality of operations selectable by operation unit 24 of electronic camera 10. When information of the menu selected by the user is sent to cradle 50 upon connection between electronic camera 10 and cradle 50, microcomputer 52 reads the display image corresponding to the received information of the menu from flash memory 58 and outputs the same to external display equipment 90. The resolution of the image such as a shooting menu to be displayed on external display equipment 90 is higher than that of the image displayed on monitor unit 4 of electronic camera 10 because it is determined by the total number of pixels of external display equipment 90.

In the first step S302 in FIG. 6, CPU 26 contained in electronic camera 10 determines whether or not electronic camera 10 is connected to cradle 50. If CPU 26 determines NO (not-connected state), the process in step S302 is repeated. If CPU 26 determines YES (connected state), the process proceeds to step S304. In step S304, CPU 26 starts communication with microcomputer 52 contained in cradle 50.

Then, in step S306, CPU 26 determines whether or not the user is selecting a menu (also referred to as "selected state") using operation unit 24. If the user is selecting a shooting menu using operation unit 24, the image appearing on monitor unit 4 is switched from a subject image to an image of the selected shooting menu.

If CPU 26 determines NO in step S306 (not-selected state), the process proceeds to step S316. In step S316, CPU 26 switches the output terminal of switch 101 from terminal 101A to terminal 101B. Accordingly, the analog video signal that has been output to monitor unit 4 is output to cradle 50. Microcomputer 52 contained in cradle 50 outputs the analog video signal received through video output terminal 10B of electronic camera 10, from video output terminal 50C of cradle 50 to external display equipment 90. The video signal is thereafter displayed on external display equipment 90.

On the other hand, if CPU 26 determines YES (selected state) in step S306, the process proceeds to step S308. In step S308, CPU 26 switches the output terminal of switch 101 from terminal 101A to terminal 101C located between terminal 101A and terminal 101B to turn off the video output to monitor unit 4 of electronic camera 10.

Then, in step S310, CPU 26 switches the setting so that the image of the menu stored in flash memory 12 is not displayed in place of the analog video signal. CPU 26 sends information of the menu selected by operation unit 24 to cradle 50.

Then, in step S312, CPU 26 switches switch 101 from terminal 101C to terminal 101B so that the video signal representing the subject image that is before switching to the image of the shooting menu is input from video output terminal 10B to video input terminal 50B of cradle 50. The input video signal representing the subject image is temporarily stored by data processing unit 60 of cradle 50.

In the next step S314, microcomputer 52 contained in cradle 50 reads the display image corresponding to the information of the menu received from electronic camera 10, from flash memory 58. Data processing unit 60 replaces the stored analog video signal representing the subject image with the image of the selected shooting menu, in accordance with control of microcomputer 52.

Then, in step S316, video encoder 56 outputs a signal replaced with the image of the shooting menu by data processing unit 60 from video output terminal 50C of cradle 50 to external display equipment 90. As a result, the image of the shooting menu appears on external display equipment 90.

FIG. 7 and FIG. 8 show an example of an image of a shooting menu displayed on external display equipment 90. FIG. 7 illustrates the case where the image displayed on monitor unit 4 of electronic camera 10 is enlarged and displayed as it is, unlike the present embodiment. FIG. 8 illustrates the case of image pickup system 100 of the present embodiment. According to image pickup system 100 of the present embodiment, as illustrated in FIG. 8, the image representing the shooting menu having the same contents as illustrated in FIG. 7 can be displayed at high resolution and at high definition.

As described above, conventionally, an image representing a shooting menu or the like displayed on monitor unit 4 of electronic camera 10 is enlarged and displayed as it is on external display equipment 90. Therefore, a low-resolution and low-visibility image is displayed on external display equipment 90. In image pickup system 100 of the present embodiment, when electronic camera 10 is connected to cradle 50, information of the menu selected by the user using operation unit 24 is sent to cradle 50. In cradle 50, a display image corresponding to the received information of the menu is read from flash memory 58 of cradle 50 and output to external display equipment 90. As a result, the high-resolution, fine image of the shooting menu can be displayed on external display equipment 90.

An image of a shooting menu may be combined with a subject image and displayed on external display equipment 90. In this case, data processing unit 60 adds the image of the shooting menu read from flash memory 58 to the analog video signal, in the above-noted step S314. In the next step S316, video encoder 56 outputs to external display equipment 90 the video signal to which the image of the shooting menu generated by data processing unit 60 is added. Accordingly, the image of the shooting menu and the subject image that are combined together are displayed on external display equipment 90.

In the foregoing embodiment, the description has been made using an image pickup system formed of an electronic camera and a cradle as an example in order to facilitate the understanding. It is needless to say that an image pickup system having any connection device other than a cradle may use a similar configuration to display a high-resolution fine character or character string on external display equipment.

In the foregoing embodiment, a character string added to a subject image is a shooting date as in FIG. 4 and FIG. 5. However, the added character string is not limited to a shooting date. A variety of character strings such as a shooting time and a data file name can be added to a subject image. The character string added to a subject image in the electronic camera may not be the same as that in the cradle. For example, only month and day without year may be displayed as a date on monitor unit 4 of electronic camera 10 having a small total number of pixels, while year, month and day may be displayed without omitting year on external display equipment 90.

In the foregoing embodiment, the image of the shooting menu as in FIG. 7 and FIG. 8 is displayed in place of a subject image on monitor unit 4 or external display equipment 90. However, the displayed menu is not limited to the shooting menu. A variety of menus such as image processing menus including brightness or contrast change may be displayed on monitor unit 4 or external display equipment 90. The content of an image representing a menu that is stored in the flash memory in the electronic camera may be not be the same as that in the cradle. For example, a more simplified menu may be displayed on monitor unit 4 of electronic camera 10 having a small total number of pixels than on external display equipment 90.

In the foregoing embodiment, a CMOS image sensor has been illustrated as an image pickup device. However, the present invention is not limited thereto, and a similar configuration may be formed with any other image pickup device, for example, a CCD (Charge-Coupled Device) imager.

Although a memory card has been illustrated as a recording medium in the foregoing embodiment, any other recording medium, for example, a hard disk, may be employed.

In the foregoing embodiment, the connected state between electronic camera 10 and cradle 50 is sensed based on that voltage detection unit 38 provided for electronic camera 10 detects a prescribed voltage based on external power supply voltage. However, the method for sensing the connected state is not limited thereto, and the connected state may be sensed, for example, based on that a switch provided for cradle 50 is turned on when electronic camera 10 is placed in cradle 50.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image pickup system comprising:
an image pickup device, and
a connection device connectable to said image pickup device,
said image pickup device including
an image pickup unit which picks up a subject image,
a display unit,
a first character image generation unit which generates a first character image representing one or more characters, and
a first control unit which allows said display unit to display said subject image, said first character image, or a combined image of said subject image with said first character image, when a connected state in which said image pickup device and said connection device are connected with each other is not established,
said first control unit outputting said subject image and information representing said one or more characters to said connection device when said connected state is established,
said connection device including
a second character image generation unit which generates a second character image representing said one or more characters based on said information representing one or more characters received from said image pickup device when said connected state is established, and
a second control unit which allows an external display device to display said subject image received from said image pickup device when said connected state is established, said second character image, or a combined image of said subject image with said second character image.

2. The image pickup system according to claim 1, wherein
a total number of pixels of said external display device is greater than a total number of pixels of said display unit, and
a resolution of said second character image is higher than a resolution of said first character image.

3. The image pickup system according to claim 2, wherein
said image pickup device further includes an operation unit which accepts selection of one of first and second display modes from a user,
said first control unit allows said display unit to display said subject image when said first display mode is selected and said connected state is not established,
said first control unit outputs said subject image to said connection device when said first display mode is selected and said connected state is established,
said first control unit allows said display unit to display a combined image of said subject image with said first character image when said second display mode is selected and said connected state is not established,
said first control unit outputs said subject image and said information representing one or more characters to said connection device when said second display mode is selected and said connected state is established,
said second control unit outputs said subject image to said external display device when said first display mode is selected and said connected state is established, and
said second control unit outputs a combined image of said subject image with said second character image to said external display device when said second display mode is selected and said connected state is established.

4. The image pickup system according to claim 3, wherein said information representing one or more characters is one or more character codes respectively corresponding to said one or more characters.

5. The image pickup system according to claim 3, wherein
said connection device is connected to an external power supply,
said image pickup device further includes
a power supply node receiving electric power supplied from said external power supply through said connection device when said connected state is established, and
a voltage detection unit which detects a value of voltage applied to said power supply node, and
said first control unit senses that said connected state is established, based on that the value of voltage detected by said voltage detection unit reaches a prescribed reference value.

6. The image pickup system according to claim 2, wherein
said image pickup device further includes a storage unit which stores a subject image when said image pickup unit picks up an image of said subject,
said one or more characters are information related to said subject image,
said storage unit stores said information representing one or more characters together with said subject image related thereto when said image pickup unit picks up an image of said subject, said first control unit reads related said information representing one or more characters together with said subject image from said storage unit, said first control unit allows said first character image generation unit to generate said first character image corresponding to said information representing one or more characters read from said storage unit when said connected state is not established, and said first control unit outputs said information representing one or more characters read from said storage unit to said connection device when said connected state is established.

7. An image pickup system comprising:

an image pickup device, and a connection device connectable to said image pickup device, said image pickup device including an image pickup unit which picks up a subject image, a display unit, an operation unit which accepts selection of one menu from a plurality of preset menus, from a user, a first storage unit which stores a plurality of first display images preset respectively corresponding to said plurality of menus, and a first control unit which allows said display unit to display said subject image when a connected state in which said image pickup device and said connection device are connected with each other is not established and when a selected state in which a menu is selected by said user is not established, and allows said display unit to display a first display image corresponding to a menu selected by said user or a combined image of said subject image with a first display image corresponding to a menu selected by said user when said connected state is not established and said selected state is established, said first control unit outputting said subject image to said connection device when said connected state is established, and said first control unit outputting information of a menu selected by said user to said connection device when said connected state is established and said selected state is established, said connection device including a second storage unit which stores a plurality of second display images preset respectively corresponding to said plurality of menus, and a second control unit which allows an external display device to display said subject image received from said image pickup device when said connected state is established and said selected state is not established, and allows said external display device to display a second display image corresponding to information of a menu selected by said user that is received from said image pickup device or a combined image of said subject image with a second display image corresponding to information of a menu selected by said user when said connected state is established and said selected state is established.

8. The image pickup system according to claim 7, wherein a total number of pixels of said external display device is greater than a total number of pixels of said display unit, and a resolution of each of said plurality of second display images is higher than a resolution of each of said plurality of first display images.

9. An image pickup system comprising:

an image pickup device, and a connection device connectable to said image pickup device, said image pickup device including an image pickup unit which picks up a subject image, a display unit, a first character image generation unit which generates a first character image representing one or more characters based on related information related to said subject image, and a first control unit which allows said display unit to display said subject image, said first character image, or a combined image of said subject image with said first character image when a connected state in which said image pickup device and said connection device are connected with each other is not established, said first control unit outputting said subject image and said related information to said connection device when said connected state is established, said connection device including a second character image generation unit which generates a second character image representing one or more characters based on said related information received from said image pickup device when said connected state is established, and a second control unit which allows an external display device to display said subject image received from said image pickup device when said connected state is established, said second character image, or a combined image of said subject image with said second character image, wherein a total number of pixels of said external display device is greater than a total number of pixels of said display unit, and a resolution of said second character image is higher than a resolution of said first character image.

\* \* \* \* \*